United States Patent
Perumal et al.

(10) Patent No.: US 10,231,116 B2
(45) Date of Patent: Mar. 12, 2019

(54) COMMUNICATION ACCESS SERVICES FOR MOBILE PHONES

(71) Applicant: INTERNATIONAL BUSINESS MACHINES CORPORATION, Armonk, NY (US)

(72) Inventors: Sivananthan Perumal, Bangalore (IN); Hisham E. Elshishiny, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/628,691

(22) Filed: Jun. 21, 2017

(65) Prior Publication Data

US 2018/0376320 A1    Dec. 27, 2018

(51) Int. Cl.

| | |
|---|---|
| H04W 4/14 | (2009.01) |
| H04W 4/16 | (2009.01) |
| H04W 12/06 | (2009.01) |
| H04W 12/02 | (2009.01) |
| H04W 36/12 | (2009.01) |
| H04W 36/22 | (2009.01) |
| H04W 8/08 | (2009.01) |
| H04W 8/26 | (2009.01) |
| H04W 8/18 | (2009.01) |
| H04W 8/02 | (2009.01) |

(52) U.S. Cl.
CPC ............... *H04W 8/08* (2013.01); *H04W 8/18* (2013.01); *H04W 8/26* (2013.01); *H04W 8/02* (2013.01)

(58) Field of Classification Search
CPC ......... H04L 41/12; H04L 63/18; H04L 12/06; H04L 63/306; H04L 12/5835; H04L 63/0272; H04L 6/20; H04W 12/02; H04W 4/14; H04W 4/16; H04W 12/06; H04W 76/43; H04W 36/22; H04W 36/12
USPC ........... 455/412.1, 413, 414.1, 418; 370/241, 370/254, 259
See application file for complete search history.

(56) References Cited

U.S. PATENT DOCUMENTS

| 6,718,026 B1 * | 4/2004 | Pershan | H04M 3/4938 |
| | | | 379/207.16 |
| 8,274,932 B2 * | 9/2012 | Iovieno | H04L 63/306 |
| | | | 370/328 |

(Continued)

FOREIGN PATENT DOCUMENTS

KR    101595120 B1    2/2016

OTHER PUBLICATIONS

Mell et al., "The NIST Definition of Cloud Computing," U.S. Department of Commerce, National Institute of Standards and Technology, Sep. 2011, pp. 1-7, Special Publication 800-145.

(Continued)

*Primary Examiner* — William D Cumming
(74) *Attorney, Agent, or Firm* — Dmitry Paskalov

(57) ABSTRACT

A communication access server may provide a client service for communication access services. The communication access server may authenticate a user having an International Mobile Subscriber Identity (IMSI) and registering user credentials. The communication access server may activate a communication interception service at a communication service provider (CSP) system for the IMSI. The communication access server may receive an intercepted communication from the CSP system and send the intercepted communication to the client service for access by a user.

20 Claims, 9 Drawing Sheets

(56) References Cited

U.S. PATENT DOCUMENTS

| | | | | |
|---|---|---|---|---|
| 8,676,745 B2* | 3/2014 | Papili | G06Q 10/087 | 707/601 |
| 8,989,713 B2* | 3/2015 | Doulton | H04L 12/5835 | 455/413 |
| 9,042,923 B1* | 5/2015 | Mirho | H04W 4/14 | 455/412.1 |
| 9,177,157 B2* | 11/2015 | Binder | H04L 63/18 | |
| 9,332,414 B2 | 5/2016 | Fan et al. | | |
| 9,402,173 B2* | 7/2016 | Chen | H04W 4/90 | |
| 9,491,620 B2* | 11/2016 | Edge | H04W 12/06 | |
| 9,497,603 B1* | 11/2016 | Singleton | H04W 4/14 | |
| 9,596,595 B2* | 3/2017 | Papili | G06Q 10/087 | |
| 9,634,995 B2* | 4/2017 | Binder | H04L 63/18 | |
| 9,699,636 B2* | 7/2017 | Chen | H04W 4/90 | |
| 9,729,580 B2* | 8/2017 | Mattes | H04L 63/0272 | |
| 9,762,547 B2* | 9/2017 | Binder | H04L 63/18 | |
| 9,813,550 B2* | 11/2017 | Kim | H04W 12/02 | |
| 2003/0233410 A1* | 12/2003 | Gusler | G06Q 10/107 | 709/206 |
| 2004/0078443 A1* | 4/2004 | Malik | G06Q 10/107 | 709/206 |
| 2004/0078444 A1* | 4/2004 | Malik | G06Q 10/107 | 709/206 |
| 2004/0078445 A1* | 4/2004 | Malik | G06Q 10/107 | 709/206 |
| 2004/0111165 A1* | 6/2004 | Yokota | G05B 19/4183 | 700/2 |
| 2008/0020755 A1 | 1/2008 | Liu et al. | | |
| 2009/0064301 A1 | 3/2009 | Sachdeva et al. | | |
| 2011/0096669 A1* | 4/2011 | Iovieno | H04L 63/306 | 370/241 |
| 2012/0166582 A1* | 6/2012 | Binder | H04L 63/18 | 709/217 |
| 2013/0212663 A1* | 8/2013 | Edge | H04W 12/06 | 726/7 |
| 2014/0302822 A1* | 10/2014 | Ye | H04W 4/12 | 455/412.2 |
| 2015/0009864 A1* | 1/2015 | Kim | H04W 12/02 | 370/259 |
| 2015/0012757 A1* | 1/2015 | Binder | H04L 63/18 | 713/190 |
| 2015/0085670 A1* | 3/2015 | Myers | H04L 63/306 | 370/241 |
| 2015/0119017 A1 | 4/2015 | Wu et al. | | |
| 2015/0163341 A1* | 6/2015 | Skovron | H04M 1/72569 | 455/418 |
| 2016/0028695 A1* | 1/2016 | Binder | H04L 63/18 | 726/12 |
| 2016/0036861 A1* | 2/2016 | Mattes | H04L 63/0272 | 726/1 |
| 2016/0088453 A1* | 3/2016 | Joo | H04W 4/16 | 455/414.1 |
| 2016/0373931 A1* | 12/2016 | Edge | H04W 12/06 | |
| 2017/0026896 A1* | 1/2017 | Enomoto | H04W 40/20 | |
| 2017/0064084 A1* | 3/2017 | Zhang | H04M 3/533 | |
| 2017/0188283 A1* | 6/2017 | Akiyoshi | H04W 28/02 | |
| 2017/0195917 A1* | 7/2017 | Akiyoshi | H04W 28/08 | |
| 2017/0201922 A1* | 7/2017 | Akiyoshi | H04W 4/70 | |
| 2017/0237779 A1* | 8/2017 | Seetharaman | H04L 63/306 | 726/30 |
| 2017/0237780 A1* | 8/2017 | Benoit | H04L 63/306 | 713/150 |
| 2017/0264733 A1* | 9/2017 | Chen | H04W 4/90 | |
| 2017/0277424 A1* | 9/2017 | Witkowski | G06F 3/04883 | |

OTHER PUBLICATIONS

Guthery et al., "How to Turn a GSM SIM Into a Web Server", Conference: Smart Card Research and Advanced Applications, Proceedings of the Fourth Working Conference on Smart Card Research and Advanced Applications, CARDIS 2000, Sep. 20-22, 2000, Bristol, UK, pp. 209-222.

Kyrillidis et al., "Web Server on a SIM Card", Proceedings of the World Congress on Engineering 2010 vol. I WCE 2010, Jun. 30-Jul. 2, 2010, London, U.K., pp. 1-7.

Simalliance, "Smart Card Web Server, How to bring operators' applications and services to the mass market", www.simalliance.org, Feb. 2009, pp. 1-18.

Tele-Pak, "WIB Card—SIM (Subscriber Identity Module) Card for GSM Network", http://www.tele-pak.com/plastic-cards/wibcards.html, Copyright 1998-2010 Tele-Pak, Inc., printed Jun. 15, 2017, 1 page.

* cited by examiner

COMMUNICATION ACCESS SERVICES FOR MOBILE PHONES

BACKGROUND

The present invention relates to mobile communication using cellular networks, and more specifically, to providing communication access services for mobile phones by providing remote access to mobile communication data.

People rely very heavily on their mobile phones and have a subscriber identity module (SIM) with an international mobile subscriber identity (IMSI) that is their main point of contact. This is used for essential communication by voice or message as well as other services. Communication is very important and an easy way to reach someone is to call him/her on his/her mobile phone for any discussions. Discussions may be personal or professional, emergency or non-critical. When a person has no access to the SIM for any reason, this can be challenging and missing emergency calls may have serious consequences.

A person may not have access to their SIM when the mobile phone is disabled due to being broken, damaged, lost, or just not charged. A person cannot use their SIM for the duration the mobile device is disabled.

Additionally, when traveling away from a person's home country, a person cannot use their home mobile SIM connection unless they opt for an international roaming service that may be expensive. The charges are based on the local provider and the home service provider contracted to. Therefore, people often choose not to enable international roaming and their SIM is therefore unavailable to them when overseas.

A solution for travel is to use social media and Voice over Internet Protocol (VOIP) applications but the drawback is that there remains no communication access from the SIM, so the subscriber does not see any messages or calls missed during the travel.

Another option may be to leave the phone in the home country in the care of another person who may receive the calls and messages and communicate them using the social media applications. The drawback is that it would be time consuming and unreliable and one should not take the risk of sharing the confidential/sensitive information like OTP with another person in the home country.

In the above scenarios, subscribers face problems when they cannot access their SIM and the calls and messages that are received in their SIM are not available to them on time. Furthermore, other information stored on the SIM, such as contact phone numbers, cannot be accessed.

To maintain a high level of security, many financial transactions are secured using a One Time Password (OTP) by financial institutions. This OTP is sent to the SIM registered with customer's bank account during the financial transactions. Also, financial transactions happening in the account may be sent as messages to the registered SIM. When a subscriber has no access to the SIM for any reasons, these critical and sensitive transactions cannot happen.

SUMMARY

According to an aspect of the present invention there is provided a computer-implemented method for providing communication access services carried out at a server, comprising: providing a client service for communication access services; authenticating a user having an International Mobile Subscriber Identity (IMSI) and registering user credentials; activating a communication interception service at a communication service provider (CSP) system for the IMSI; receiving an intercepted communication from the CSP system; and sending the intercepted communication to the client service for access by a user.

According to a further aspect of the present invention there is provided a system for providing communication access services in the form of a communication access server, comprising: a processor and a memory configured to provide computer program instructions to the processor to execute the function of the components: a client service component for providing a client service for communication access services; an authentication component for authenticating a user having an International Mobile Subscriber Identity (IMSI) and registering user credentials; a communication service provider (CSP) interface component for activating a communication interception service at a CSP system for the IMSI; and a transmission component for receiving an intercepted communication from the CSP system and sending the intercepted communication to the client service for access by a user.

According to a further aspect of the present invention there is provided a computer program product for providing communication access services carried out at a server, the computer program product comprising a computer readable storage medium having program instructions embodied therewith, the program instructions executable by a processor to cause the processor to: provide a client service for communication access services; authenticate a user having an International Mobile Subscriber Identity (IMSI) and registering user credentials; activate a communication interception service at a communication service provider (CSP) system for the IMSI; receive an intercepted communication from the CSP system; and send the intercepted communication to the client service for access by a user.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A system and method are described for providing a SIM communication access service to access SIM communications from the Communication Service Provider's (CSP) system including security authentication of the subscriber. The method and system may be used when the SIM is not available to the user. This may be, for example, due to the user being outside the country of the SIM without activating an international roaming service, the SIM being removed from a mobile phone, or the mobile phone in which the SIM is held being unavailable as it is broken, lost or has no battery capacity.

A mobile application and/or a web application are described for users to subscribe to the service to access SIM communications and other data stored on the SIM such as contacts when the SIM is unavailable to them via normal use. In a further embodiment, the SIM communication access service may integrate with a messaging application (for example, a user's existing messaging application) to provide the SIM communication data.

The method and system provide web services, for example, in the form of Representational state transfer (REST) application programming interface (API) based services to access the CSP's system and provide the subscriber with data about their missed communications and contacts. For example, their missed communications may include missed voice calls, voice messages, short message service (SMS) messages, and unstructured supplementary service data (USSD) messages.

Figure 1:
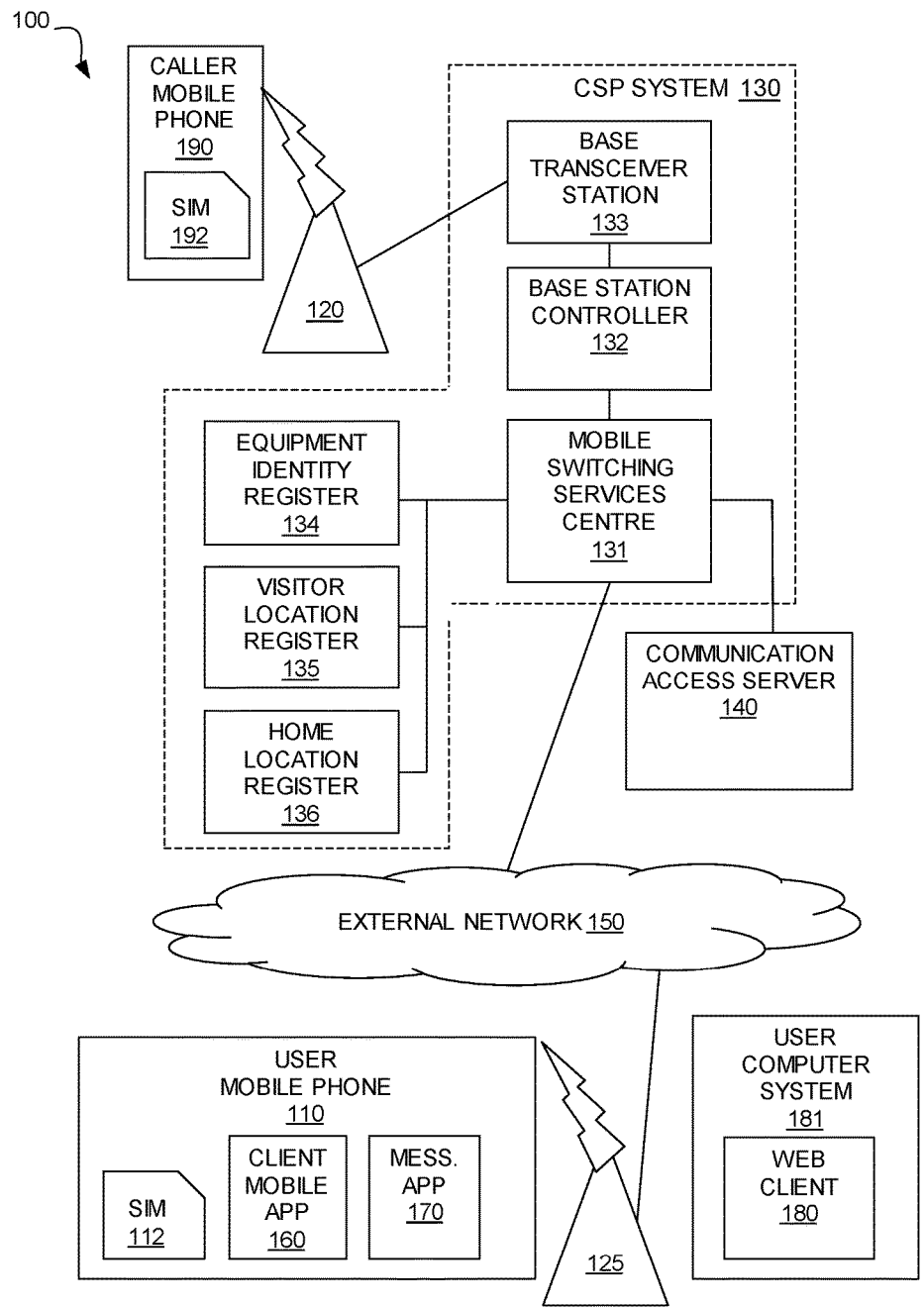
FIG. 1 is a schematic diagram of a mobile phone network and a communication access service system in accordance with the present invention.

Referring to FIG. 1, a schematic diagram 100 shows a Communication Service Provider's (CSP) system for mobile phone communication as adapted to provide the described functionality for SIM communication access.

A CSP system 130 includes multiple mobile stations 120, a base station subsystem including a base transceiver station 133 and a base station controller 132, and a network switching subsystem including a mobile switching services center (MSC) 131, home location register 136, visitor location register 135 and equipment identity register 134. The CSP system may include operations support systems (OSS) in the form of computer systems for managing a CSP network and support management functions.

The described system extends the functionality of the MSC 131 through a server referred to herein as a communication access server 140.

The communication access server 140 integrates with the MSC 131 using the available MSC interfaces. The MSC 131 monitors the voice calls made to and from a mobile station 120 and charges for the call, call routing, multi-way calling, call forwarding and other supplementary services. In the described system, a communication is routed through the communication access server 140 with the help of the MSC 131. The OSS may provide support for the MSC 131 and the interfaces.

The CSP system may link to an external communication network 150 and mobile stations 125 belonging to other CSP systems.

In this illustrated scenario, a user may have a mobile phone or device 110 with a SIM 112 having an International Mobile Subscriber Identity (IMSI). The SIM 112 may be currently inaccessible to the user due to any one of a number of reasons, such as the user being in a different country and not having activated an international roaming service, or the mobile phone 110 being damaged or otherwise out of order.

The user of the SIM 112 may subscribe to the service of the communication access server 140. In one embodiment, the user may access the service via a web client 180 on a user's computer system 181. In another embodiment, the user may access the service via a client mobile application 160 which may be provided on the mobile phone 110 housing the SIM 112, for example, if the mobile phone 110 is being used overseas, or on a different mobile phone or device, for example, if the mobile phone 110 housing the SIM 112 is broken or lost. In a third embodiment, the service may integrate with another messaging application 170 of the user provided on the mobile phone 110 housing the SIM 112 or an alternative device.

In use, a caller may use their mobile phone 190 having a SIM 192 to call or send a message to the user who's SIM 112 is currently inaccessible to its owner. The callee may access the call or message via the communication access server 140 using one of the web client 180, client mobile application 160, or integrated existing messaging application 170 as described in detail below.

Figure 2A:
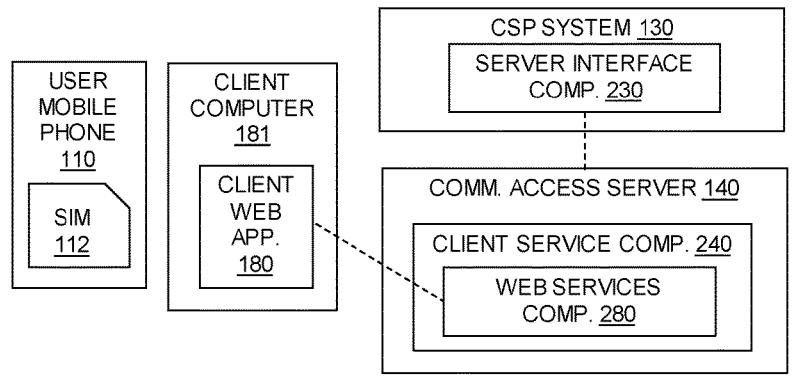
FIGS. 2A, 2B and 2C are three example embodiments of alternative arrangements of a communication access service system in accordance with the present invention.
Figure 2B:
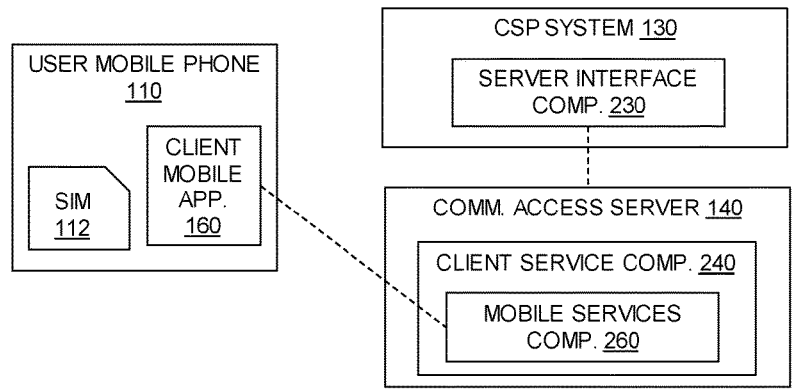
Figure 2C:
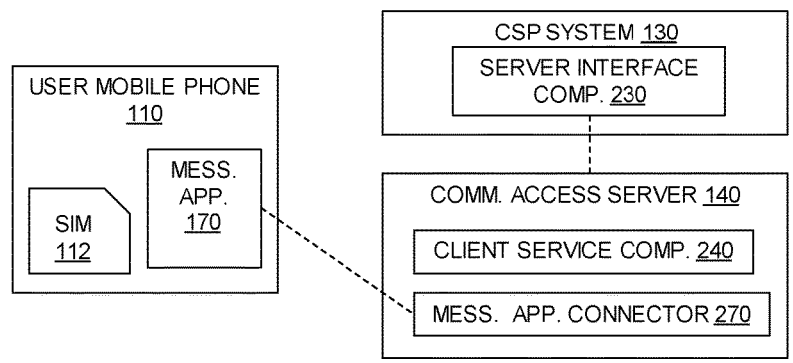

Referring to FIGS. 2A, 2B and 2C, three embodiments of the described system are illustrated as examples. Each of the embodiments shows a user mobile phone 110 having a SIM 112 which is currently inaccessible to the user. The SIM 112 may be removed and separate from the user mobile phone 110. A CSP system 130 is shown having a server interface component 230 for interfacing with the communication access server 140.

FIG. 2A shows a block diagram of a first embodiment of the described system in which the user may access the service of the communication access server 140 using a client web application 180 via a web browser of a client computer 181 (for example, a personal computer or an Internet café computer). The communication access server 140 may include a client service component 240 having a web services component 280.

In this embodiment, the web services component 280 provides web services to the client web application 180 (for example, REST (Representational state transfer) web services, Java™ (Java™ and all Java-based trademarks and logos are trademarks or registered trademarks of Oracle Corporation and/or its affiliates) web services, or other web services) via the communication access server 140 to access the CSP system 130 and to provide the subscribers with communication data of their SIM 112. The web services may provide a service using technology such as HTTP (hypertext transfer protocol) for machine-to-machine communication for transferring readable file formats such as XML (extensible markup language) and JSON (JavaScript™ Object Notation JavaScript™ and all JavaScript-based trademarks and logos are trademarks or registered trademarks of Oracle Corporation and/or its affiliates).

The subscriber in this embodiment may use credentials, for example, including a user ID and password, provided by his/her CSP to access the CSP system 130 through the client web application 180. The CSP may provide this service through a fee or may provide it as a bonus service that differentiates them from competition.

FIG. 2B shows a block diagram of a second embodiment of the described system in which the user may access the service of the communication access server 140 using a client mobile application 160 on the user's mobile phone 110 or on an alternative device. The communication access server 140 may include a client service component 240 having a mobile services component 260.

In this embodiment, the mobile services component 260 provides mobile web services to the client mobile application 160 (for example, REST mobile web services, Java™ mobile web services, or other web services) via the communication access server 140 to access the CSP system 130 and to provide the subscribers with communication data of their SIM 112. The mobile web services may provide a service using technology such as HTTP (hypertext transfer protocol) for machine-to-machine communication for transferring readable file formats such as XML (extensible markup language) and JSON (JavaScript™ Object Notation) (JavaScript™ is a trade mark of Oracle Corporation).

In case the subscriber is in another country and wants to access the data stored on his SIM 112, or wants to carry out a financial transaction (without using the expensive roaming service), he/she can access the client mobile application 160 to access his/her SMSs, to receive the One Time Password (OTP) sent by the bank to complete his transaction, or to access data stored on the SIM.

The client mobile application 160 helps the mobile subscriber to access the GSM services attached to the SIM 112. A user authenticates with their credentials provided by the CSP. Once authenticated, users may be provided with their call history, text and voice messages received in their SIM 112. This may be a "view only" application for basic users, or may have further features for advanced users enabling them to respond to their messages and calls via the communication access server 140. Responses may use communication facilities provided by the client mobile application 160.

In one embodiment, the client mobile application 160 may be linked to another messaging application operating on the user mobile phone 110 and users may use the application to access and respond to the communications.

Registration for the client mobile application 160 may be made with the CSP to make updates and configurations for the registered SIM 112. The CSP may provide the registration for using this application to access the GSM services while the SIM 112 is not available. Once the registration is completed, the CSP may provide a link to download client mobile application 160 and authentication credentials.

FIG. 2C shows a block diagram of a third embodiment of the described system in which the user may access the service of the communication access server 140 using an existing messaging application 170 on the user's mobile phone 110 or on an alternative device. The communication access server 140 may include a client service component 240 and a messaging application connector 270. The messaging application connector 270 may provide mobile web services integrated into the existing messaging application 170.

In this embodiment, the message application connector 240 provides mobile web services to the existing messaging application 170 on the user mobile phone 110, (for example, REST mobile web services, Java™ mobile web services, or other web services) via the communication access server 140 to access the CSP system 130 and to provide the subscribers with communication data of their SIM 112.

The described method and system may use the integration with an existing messaging application, for example, an instant messaging application, to receive the communications. These may be provided as forwarded messages, missed call alerts, text conversions of voice messages. This embodiment may avoid the need to use a dedicated mobile application or web application to access the communications.

An existing messaging application 170 may be an instant messaging (IM) application, which uses communication transmission over the Internet using the telecommunication operator's network. The instant messaging application may use the SIM's 112 IMSI, for example, WHATSAPP® instant messaging application (WHATSAPP and all WHATSAPP-based trademarks and logos are trademarks or registered trademarks of WhatsApp Inc. and/or its affiliates).

The user may use the existing messaging application 170 to browse contacts, send/receive calls, send/receive texts, etc. from the access service for the SIM 112.

This third embodiment establishes integration with an existing messaging application 170 to receive the SMSs as IM messages and calls as missed call alert messages in the IM application on the user's mobile phone 110. This may be provided as a premium service provided by the CSP for additional charge as this would be automatic and no need to use the mobile application or web application to access the messages and missed calls.

The messaging application connector 270 may be an integration component to integrate the SMS messages of the SIM and IM messages seamlessly. At a high level, the connector 270 may carry out the following steps:

Receive an SMS from the CSP System 130 for a user who is abroad or when his/her SIM 112 is not available;
Make an IM connection with the user using his/her IM details provided during registration;
Convert the SMS message into an IM message;
Post the IM message to the user;
Receive an IM message response from the user;
Convert the IM message response to an SMS message;
Make a connection to SMS gateway; and
Send the SMS message to the message sender.

The SMS message are stored in telecommunications server and this method retrieves an SMS text message using the existing encode/decode method at telecommunications server and converts the message to form a text message to be sent as an IM message.

To get and use the service, a user registers with the CSP to provision the services for them in the communication access server 140. Once the user registers, he/she gets the access to the client mobile application 160, the URL for the client web application 180, and/or access to a connector to an existing messaging application 170.

Figure 3:
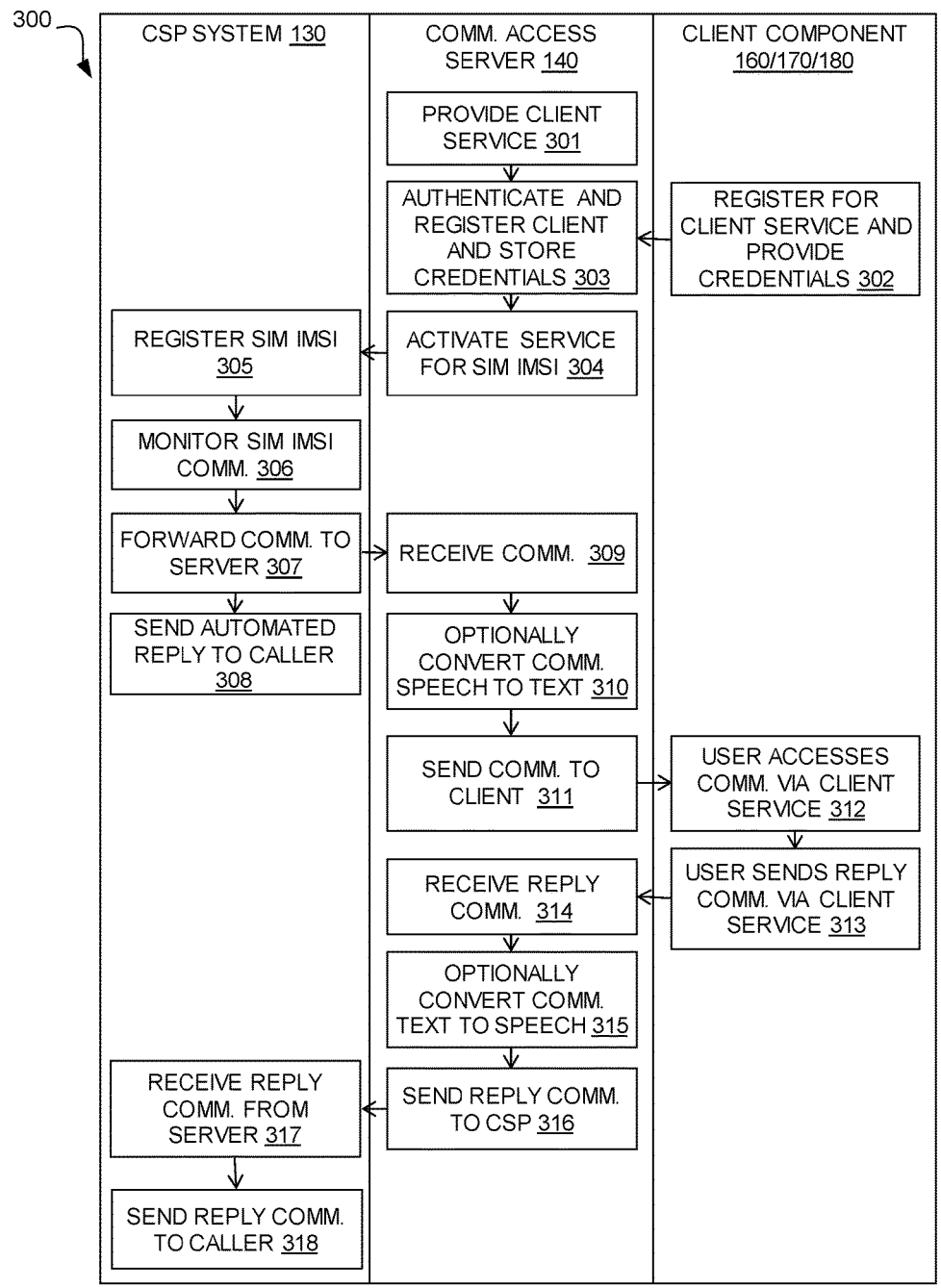
FIG. 3 is a swim-lane flow diagram illustrating an example embodiment of a method in accordance with the present invention.

Referring to FIG. 3, a swim-lane flow diagram 300 shows an example embodiment of the described method as it is carried out by a client component which may be one of the client web application 180, the client mobile application 160, or the existing messaging application 170, in communication with the communication access server 140 and the CSP system 130.

The communication access server 140 may provide the client service 301 by exposing a client component such as a client web application 180, a client mobile application 160, or a message application connector for a messaging application 170. A client component 160/170/180 may be authenticated and register for the client service and provide credentials 302 which are registered 303 at the server 140. This may be in conjunction with an agreement or contract with the CSP.

The server 140 may activate 304 the service with the CSP system 130 for the SIM IMSI of the registered user. The CSP system 130 in the form of an OSS interface with the MSC 131 may register 305 the SIM IMSI in a register of IMSIs for which communication forwarding is activated.

The CSP system 130 may monitor 306 SIM IMSI communications and may intercept communications for registered IMSIs. An intercepted communication may be forwarded 307 to the server 140 in an appropriate format that includes details of the originator of the communication and an automatic reply, such as an automated message may be sent 308 to the originator of the communication informing them that the communication has been forwarded.

The server 140 may receive 309 the forwarded communication and, if it is a voice communication, may convert 310 the speech to text. The text communication may then be sent 311 to the client component 160/170/180.

The user may access 312 the communication via the client service and may send 313 a reply via the client service.

The server 140 may receive the reply communication 314 and, if it is a text message in response to an original voice message, may convert the communication from text to speech 315. The reply communication may be sent 316 to the CSP system 130.

The CSP system 130 may receive 317 the reply communication and may send 318 this to the originator of the communication to which the reply applies.

The client component 160/170/180 may use function calls of the service provided by the communication access server 140 to carry out operations. For example, a getMissed Calls( ) operation may retrieve details of missed calls from the CSP system 130. In another example, getContacts( ) may retrieve contact information from the CSP system. The web services may have codes to access the telecommunications server to obtain the details.

Figure 4A:
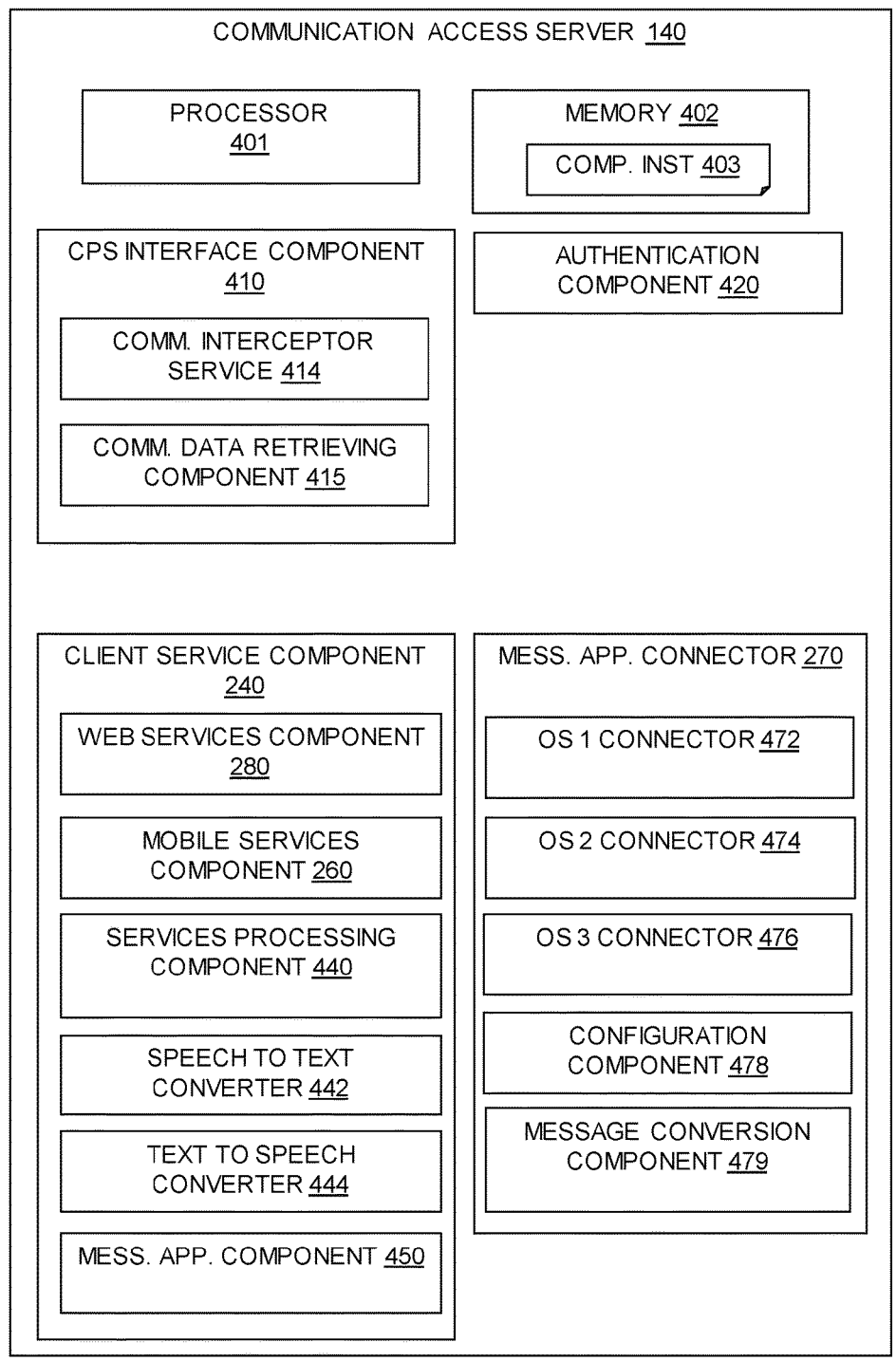
FIGS. 4A, 4B and 4C are block diagrams of different aspects of the communication access service system in accordance with the present invention.
Figure 4B:
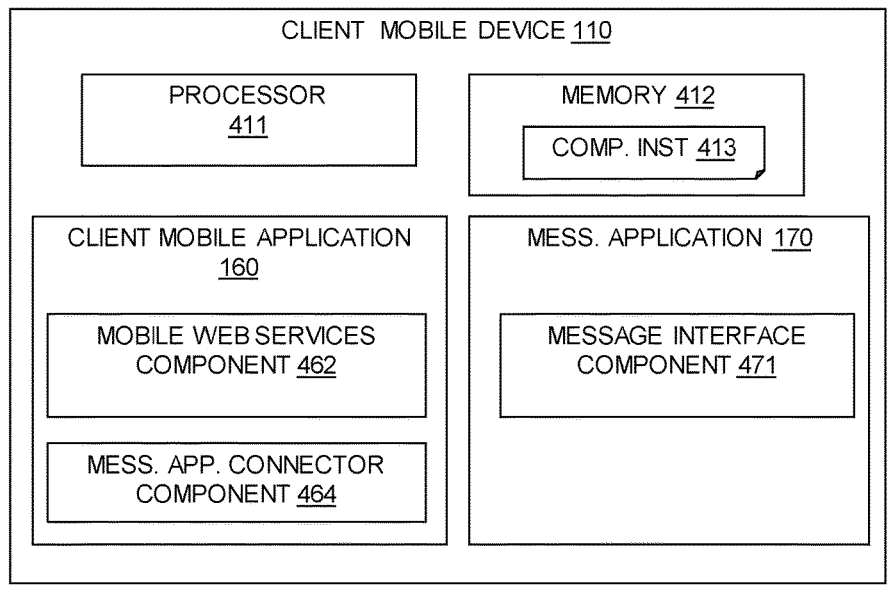
Figure 4C:
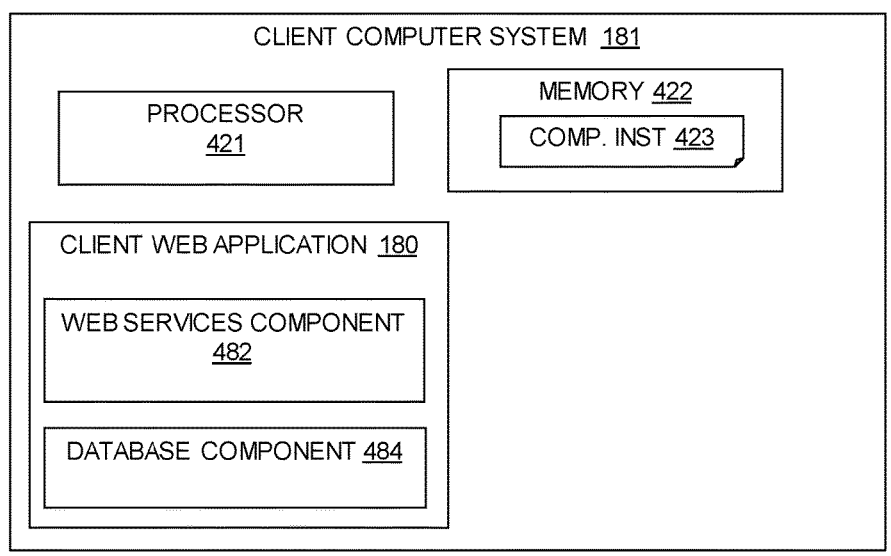

Referring to FIGS. 4A, 4B and 4C, block diagrams show example embodiments of aspects of the described system. The described system has two major components namely, a communication access server 140 and a corresponding client. The client may be a mobile client or a desktop browser based thin client. FIG. 4A shows the communication access server 140, FIG. 4B shows a client mobile phone or device 110, and FIG. 4C shows a client computer system 181.

Referring to FIG. 4A, the communication access server 140 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The communication access server 140 may include a CSP interface component 410 for interfacing with the MSC component 131 of the OSS of the CSP system 130. This may be in the form of the existing interface implemented in MSC 131 in the form of a Mobile Application Part (MAP) that is an application layer to interface with MSC.

The CSP interface component 410 may include a communication interceptor service 414 for instructing a MSC 131 to intercept messages for registered SIM IMSIs. The CSP interface component 410 may also include a communication data retrieving component 415 for retrieving communication data from the SIM using calls to the MSC 131 to access the data from a server of the telecommunications network.

The communication access server 140 may include an authentication component 420 for authenticating a client user using credentials registered with the CSP.

The communication access server 140 may include a client service component 240 that provides the mechanism for clients (web and mobile) to connect to it to receive the SIM communication access services.

The client service component 240 may include a web services component 280 that exposes the web services for clients to connect and access the SIM features and a mobile services component 260 that exposes mobile web services for mobile clients to connect and access SIM features. The client service component 240 may include service processing component 440 that provides, for example, REST API/web services/HTTP services for clients to connect and access SIM features.

The client service component 240 may optionally include a speech to text convertor 442 for converting voice communications such as voice mail from a caller to text and a text to speech convertor 444 for converting a reply text communication to voice.

The client service component 240 may also include a messaging application component 450 for integrating the mobile services component 260 with an existing messaging application on the user's mobile device for use in cooperation with a client mobile application in accordance with the embodiment shown in FIG. 2B.

The communication access server 140 may include a messaging application connector 270 for connecting to an existing messaging application on the user's mobile device (for example, a WhatsApp Messenger instant messaging application) to integrate the service into the existing messaging application in accordance with the embodiment shown in FIG. 2C.

The messaging application connector 270 may be provided with connector components 472, 474, 476 for different forms of operating system of the user's mobile device and a configuration component 478 that maintains all the connection and profile parameters for all the users and their IM details to make IM messages automatically by the application to the receivers.

The messaging application connector 270 may include a message conversion component 479 for receiving and converting the messages received from the CSP to suitable messages for the existing messaging application 170 at the client. The message conversion component 479 may have interfaces to connect to the existing messaging application to receive messages and may have plugins to the existing messaging application or use APIs to send messages.

Referring to FIG. 4B, the client mobile phone or device 110 may include at least one processor 411, a hardware module, or a circuit for executing the functions of the described components which may be software units executing on the at least one processor. Memory 412 may be configured to provide computer instructions 413 to the at least one processor 411 to carry out the functionality of the components.

The client mobile device 110 may install a dedicated client mobile application 160 including a mobile web services component 462 for providing web services such as REST API/mobile web services/HTTP services. The client mobile application 160 may include a messaging application connector component 464 for connecting the client mobile application 160 with an existing messaging application on the mobile device 110, such as an IM application. The mobile device user may use the message application connector component 464 in the form of a plugin to existing messaging applications 170 to connect to a messaging application connector 270 in the communication access server 140 to receive and send messages as a response to the call or texts.

In an alternative embodiment, the client mobile device 110 may have an existing messaging application 170 for which a message conversion component 479 is provided at the communication access server 140 which interacts with a message interface component 471 of the existing messaging application 170. The message interface component 471 receives the converted messages received from the CSP as suitable messages for the existing messaging application 170. The message interface component 471 may provide interfaces to connect to the communication access server to receive messages and may have plugins to the existing messaging application or use APIs to send and receive messages.

Users using mobile devices may be provided with the client mobile application 160 after the registration with the service. Using the client mobile application 160, the users may browse the contacts, send/receive calls, send/receive texts etc.

Referring to FIG. 4C, the client computer system 181 may include at least one processor 421, a hardware module, or a circuit for executing the functions of the described components which may be software units executing on the at least one processor. Memory 422 may be configured to provide computer instructions 423 to the at least one processor 421 to carry out the functionality of the components.

The client computer system 181 may access a client web application 180 via a web browser including a web services component 482 which may provide, for example, REST API/web services/HTTP services for clients to connect and access SIM features. The client web application 180 may include a database component 484.

Users using the desktop client, may use the client web application 180 to access the communication access server 140, and in turn access their SIM services such as browse contacts, call history, text messages etc. The client web application 180 may be deployed at a service provider location and, once a user completes the registration, the URL will be sent to the user for accessing the application from browser client.

Some example scenarios are now described for illustration purposes.

Scenario 1

Known/unknown caller (who may be a feature phone user) leaves a voice mail to the traveler who is not using his/her home SIM abroad or someone who has broken his phone or lost the SIM;

Call goes through the typical telco systems such as BSS/OSS;

The OSS processes the call and responds with the automated voice message to the caller.

In parallel, OSS checks the callee number in a register and verifies the callee is registered for the communication access services;

Upon the confirmation of registration, OSS sends the call to the client service component in the communication access server for processing;

During the processing, the speech to text convertor converts the voice mail message into a text message;

The client service component invokes the messaging application connector and makes the connection to the callee and publishes the text that was converted to a text message.

The callee, the service user, may respond with a text in the messaging application that goes to the communication access server; and The communication access server may use the text to speech convertor to convert the response text to voice and send the voice to the caller as a voice mail.

Scenario 2

The user is a web user and logs into the communication service URL and browses the SIM messages, converted voice mail into text, and call history;

The web user wishes to carry out an online banking transaction abroad, the bank sends the One Time Password (OTP) to the user's SIM;

The OTP message goes through the typical telco systems such as BSS/OSS;

In parallel, OSS checks the callee number in the register and verifies the callee is registered for the communication access services;

Upon the confirmation of registration, OSS sends the OTP message to the client service component in the communication access server for processing; and The web user logs into the web service URL and access his/her OTP.

The described method and system focuses on enabling the SIM in the web to access it through the communication service provider systems using mobile and web applications and it assumes that the user does not have access to their SIM. The method and system provide the seamless SIM services through tools such as IM applications or social media applications by integration with these applications. The SIM card is not required to use the SIM services.

The system and method access the SIM from the CSP system based on proper security authentication by the subscriber. There is no web server required to be installed in the SIM card.

The service permits subscribers to still get access to their calls and SMSs and other sensitive data stored on their SIM, when the subscriber has no access to his SIM.

The described solution provides a mechanism and system for mobile subscribers to access their calls and SMSs when the subscriber does not have the SIM installed, is travelling abroad, or the device in which the SIM is installed is not functioning, but the SIM is still activated. When a call or message is addressed to the active SIM card, the call or message first goes to the CSP systems, such as base station through the micro and macro towers. Conventionally, a response would be received from the CSP's system to the caller saying the mobile is switched off or not reachable and also the messages are undelivered due to SIM not available. With the described method and system, a response may indicate that the call or message has been forwarded. The user may access their call history and SMSs when he/she does not have access to his/her SIM via the described service. As an additional service, subscribers may also subscribe to receive messages automatically via another existing messaging application as configured in the service.

Figure 5:
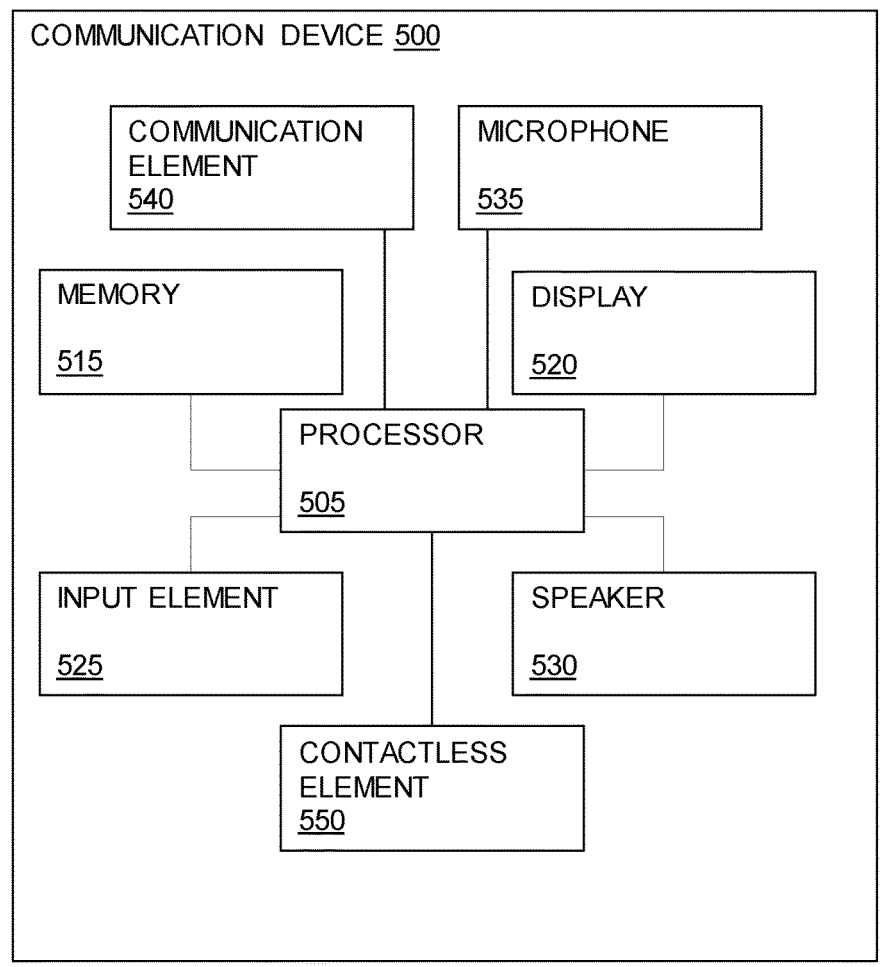
FIG. 5 is a block diagram of an embodiment of a mobile communication device in which aspects of the present invention may be implemented.

FIG. 5 shows a block diagram of a communication device Y00 that may be used in embodiments of the disclosure. The communication device 500 may be a mobile cell phone, a feature phone, a smart phone, a satellite phone, or a computing device having a phone capability, including a wearable device such as glasses, watches, etc.

The communication device 500 may include a processor 505 (e.g., a microprocessor) for processing the functions of the communication device 500 and a display 520 to allow a user to see the phone numbers and other information and messages. The communication device 500 may further include an input element 525 to allow a user to input information into the device (e.g., input buttons, touch screen, etc.), a speaker 530 to allow the user to hear voice communication, music, etc., and a microphone 535 to allow the user to transmit his or her voice through the communication device 500.

The processor 510 of the communication device 500 may connect to a memory 515. The memory 515 may be in the form of a computer-readable medium that stores data and, optionally, computer-executable instructions.

The communication device 500 may also include a communication element 540 for connection to communication channels (e.g., a cellular telephone network, data transmission network, Wi-Fi network, satellite-phone network, Internet network, Satellite Internet Network, etc.). The communication element 540 may include an associated wireless transfer element, such as an antenna.

The communication element 540 may include a subscriber identity module (SIM) in the form of an integrated circuit that stores an international mobile subscriber identity (IMSI) and the related key used to identify and authenticate a subscriber using the communication device 500. One or more subscriber identity modules may be removable from the communication device 500 or embedded in the communication device 500.

The communication device 500 may further include a contactless element 550, which is typically implemented in the form of a semiconductor chip (or other data storage element) with an associated wireless transfer element, such as an antenna. The contactless element 550 may be associated with (e.g., embedded within) the communication device 500 and data or control instructions transmitted via a cellular network may be applied to the contactless element 550 by means of a contactless element interface (not shown). The contactless element interface may function to permit the exchange of data and/or control instructions between mobile device circuitry (and hence the cellular network) and the contactless element 550.

The contactless element 550 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 500 and an interrogation device. Thus, the communication device 500 may be capable of communicating and transferring data and/or control instructions via both a cellular network and near field communications capability.

Figure 6:
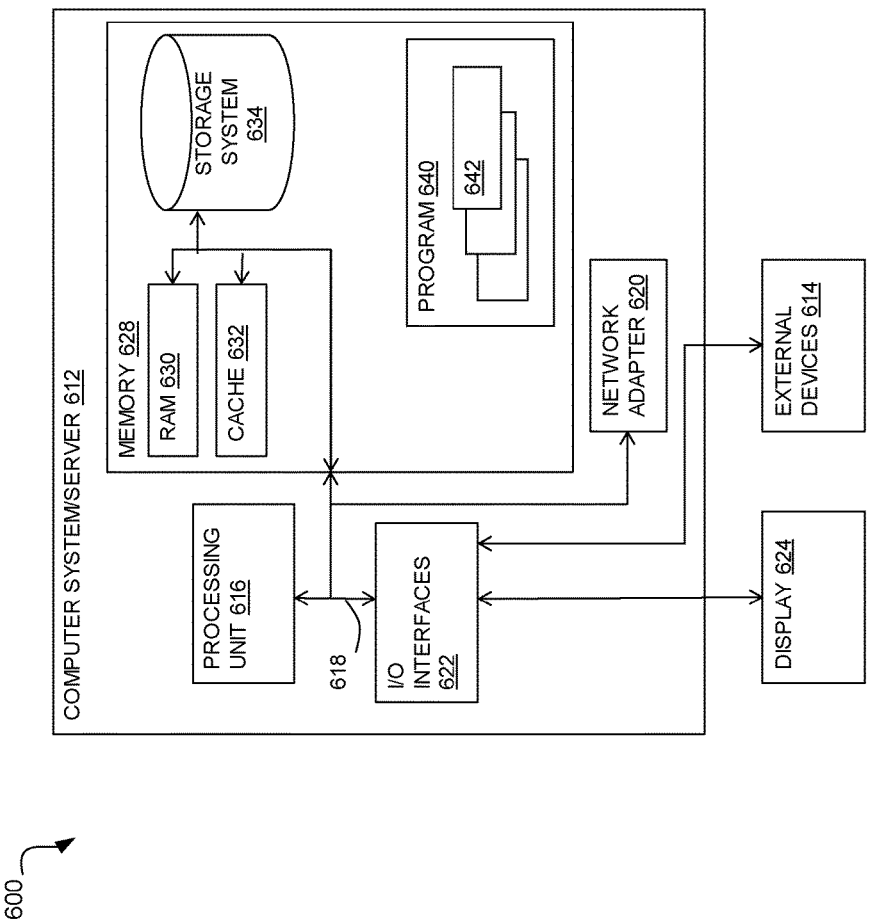
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
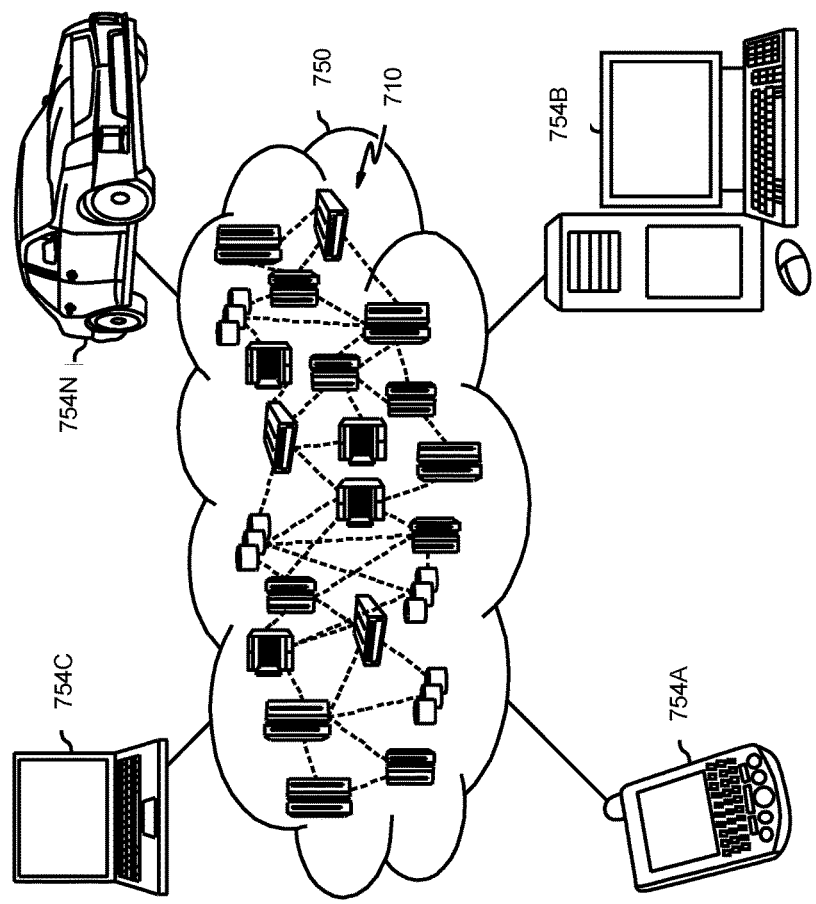
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
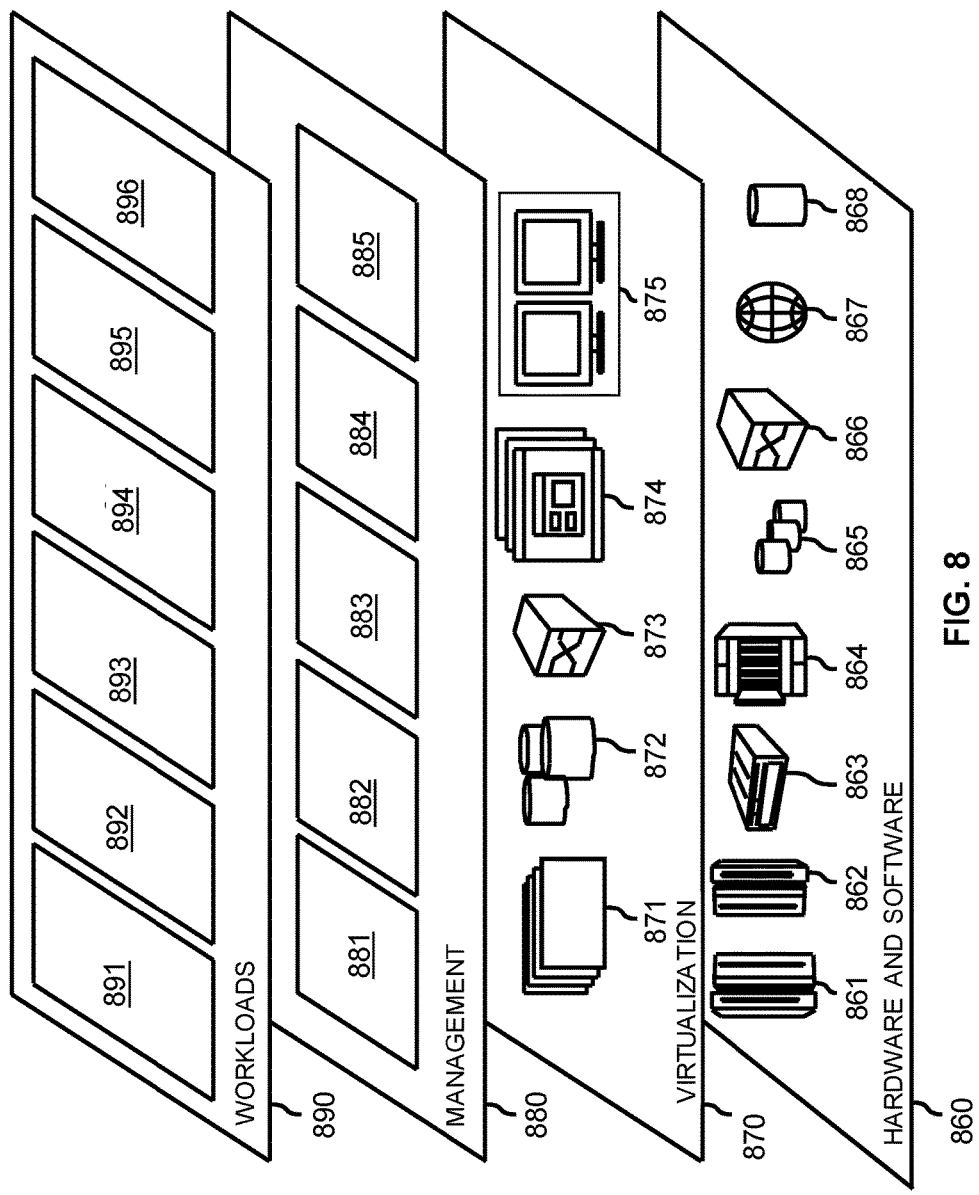
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and communication access services 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for providing communication access services carried out at a server when a Subscriber Identity Module (SIM) of a user is unavailable, the computer-implemented method comprising:
   providing a client service provider for communication access services;
   authenticating the user having an International Mobile Subscriber Identity (IMSI) and registering user credentials;
   monitoring SIM IMSI communications, wherein monitoring the SIM IMSI communications comprises:
      activating a communication interception service at a communication service provider (CSP) system for the IMSI;
      receiving an intercepted communication from the CSP system; and
      sending the intercepted communication to the client service provider for access by the user.

2. The method as claimed in claim 1, wherein monitoring the SIM IMSI communications further comprising:
   receiving a reply communication from the client service provider; and
   sending the reply communication to the CSP system for forwarding to an originator of the intercepted communication.

3. The method as claimed in claim 2, wherein monitoring the SIM IMSI communications further comprising:
   converting a received intercepted communication of a voice call to a text message using speech to text conversion; and
   converting a reply communication of a text message to a voice message using text to speech conversion.

4. The method as claimed in claim 1, wherein monitoring the SIM IMSI communications further comprising:
   receiving a request from the client service provider to access communication data related to the IMSI or stored on a Subscriber Identity Module (SIM) of the IMSI;
   issuing a function call to carry out an operation at the CSP system to obtain a requested communication data; and
   obtaining the requested communication data and providing it to the client service provider.

5. The method as claimed in claim 1, wherein the client service provider is a client web service for access by a user from a remote client computer or a mobile web service application for a mobile device that communicates with the server.

6. The method as claimed in claim 1, wherein the client service provider is provided for connection with or integrated into an existing messaging application for connecting an existing messaging application on a mobile device with the server.

7. The method as claimed in claim 6, wherein monitoring the SIM IMSI communications further comprising:
   converting a received intercepted communication to a format suitable for receipt by the existing messaging application on a client mobile device.

8. The method as claimed in claim 1, wherein the method is provided as a service in a cloud environment.

9. The method as claimed in claim 1, further comprising:
   intercepting communications to a IMSI registered for a communication access service;

forwarding intercepted communications including the IMSI of their originator to a communication access server for transmission to a client service provider for authenticated users; and receiving a reply message from the communication access server and forwarding the reply message with the IMSI to the originator.

10. The method as claimed in claim 9, wherein monitoring the SIM IMSI communications further comprising:

sending an automated message to the originator that indicates that the message is being forwarded to the user.

11. A computer system for providing communication access services to a communication access server when a Subscriber Identity Module (SIM) of a user is unavailable, the computer system comprising:

one or more processors, one or more computer-readable memories, one or more computer-readable tangible non-transitory storage medium, and program instructions stored on at least one of the one or more tangible non-transitory storage medium for execution by at least one of the one or more processors via at least one of the one or more memories, wherein the computer system comprising:

a client service component for providing a client service provider for communication access services;

an authentication component for authenticating the user having an International Mobile Subscriber Identity (IMSI) and registering user credentials;

a communication service provider (CSP) interface component for activating a communication interception service at a CSP system for the IMSI, wherein the communication interception service at the CSP system for the IMSI is activated after the user subscribed to the communication access services; and a transmission component for receiving an intercepted communication from the CSP system and sending the intercepted communication to the client service provider for access by the user.

12. The computer system of claim 11, wherein the transmission component is for receiving a reply communication from the client service provider and sending the reply communication to the CSP system for forwarding to an originator of the intercepted communication.

13. The computer system of claim 11, comprising:

a convertor for converting a received intercepted communication of a voice call to a text message using speech to text conversion; and a convertor for converting a reply communication of a text message to a voice message using text to speech conversion.

14. The computer system of claim 11, comprising a communication data retrieving component for:

receiving a request from the client service provider to access communication data related to the IMSI or stored on the SIM of the IMSI;

issuing a function call to carry out an operation at the CSP system to obtain the requested communication data; and obtaining the requested communication data and providing it to the client service provider.

15. The computer system of claim 11, wherein the client service provider is a web service for access by the user from a remote client computer.

16. The computer system of claim 11, wherein the client service provider is a mobile web service application for a mobile device that communicates with the server.

17. The computer system of claim 16, wherein the mobile web service application sends and receives messages via an existing message application at the mobile device.

18. The computer system of claim 11, wherein the client service provider is integrated into an existing messaging application for connecting an existing messaging application on a mobile device with the server.

19. The computer system of claim 18, comprising a message conversion component for converting a received intercepted communication to a format suitable for receipt by the existing messaging application on a client mobile device.

20. A computer program product for providing communication access services carried out at a server when a Subscriber Identity Module (SIM) of a user is unavailable, the computer program product comprising:

one or more computer-readable tangible non-transitory storage medium and program instructions stored on at least one of the one or more tangible non-transitory storage medium, the program instructions executable by a processor, the program instructions comprising:

program instructions to monitor SIM IMSI communications, wherein the program instructions to monitor the SIM IMSI communications comprises:

program instructions to provide a client service provider for communication access services;

program instructions to authenticate the user having an International Mobile Subscriber Identity (IMSI) and registering user credentials;

program instructions to activate a communication interception service at a communication service provider (CSP) system for the IMSI;

program instructions to receive an intercepted communication from the CSP system; and program instructions to send the intercepted communication to the client service provider for access by the user.

* * * * *